United States Patent [19]

Rest et al.

[11] 4,454,688
[45] Jun. 19, 1984

[54] WINDOW GUIDE AND SEAL FOR LOWERABLE VEHICLE WINDOW

[75] Inventors: Heinz Rest, Cologne; Ralf Giese, Mechernich-Kommern-Süd, both of Fed. Rep. of Germany

[73] Assignee: Ford Motor Company, Dearborn, Mich.

[21] Appl. No.: 358,157

[22] Filed: Mar. 15, 1982

[30] Foreign Application Priority Data

Mar. 19, 1981 [DE] Fed. Rep. of Germany ....... 3110669

[51] Int. Cl.³ .............................................. B60J 5/04
[52] U.S. Cl. ...................................... 49/502; 49/374; 49/491; 49/440
[58] Field of Search ................ 49/374, 375, 348, 428, 49/490, 49 L, 482, 440, 441, 493

[56] References Cited

U.S. PATENT DOCUMENTS

| | | | |
|---|---|---|---|
| 2,893,781 | 7/1959 | Hoag et al. | 49/375 R |
| 2,941,838 | 6/1960 | Wernig | 493/374 X |
| 4,240,227 | 12/1980 | Hagler et al. | 49/348 |

FOREIGN PATENT DOCUMENTS 1430881 12/1968 Fed. Rep. of Germany ........ 49/428

Primary Examiner—Kenneth Downey
Attorney, Agent, or Firm—Daniel M. Stock; Clifford L. Sadler

[57] ABSTRACT

A window guide and seal for a lowerable window in a motor vehicle of which the plane of the window is in alignment with the external surface of the bodywork and which is connected at its edges with edge strips forming inward rebounding rims which interact with guideways and sealing strips disposed in the frame opening, the window (4) is firmly connected only at its lateral vertical edges (5 and 6) with guideways (7 and 8) and at its upper inclined and horizontal edge (9) interacts with a sealing strip (10) fixed in the frame opening (3). The guideways (7 and 8) fixed at lateral vertical edges (5 and 6) here have an S shaped profile and encompass with their narrower section (14) the vertical edges (5 and 6) of the window (4) and slide with their wider section (15) on an edge protection guideway (25) or in a sealing and guiding track (18). The guideways (7 and 8) are here preferably clamped at the edges (5 and 6) of the window (4).

6 Claims, 6 Drawing Figures

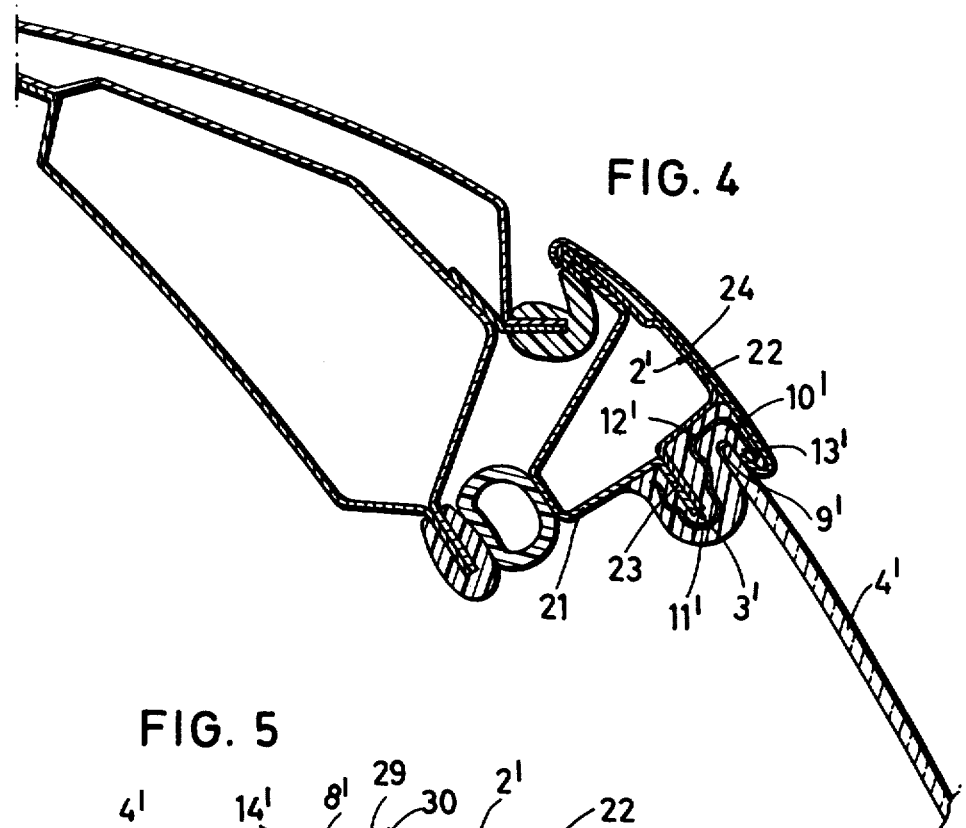
FIG. 4
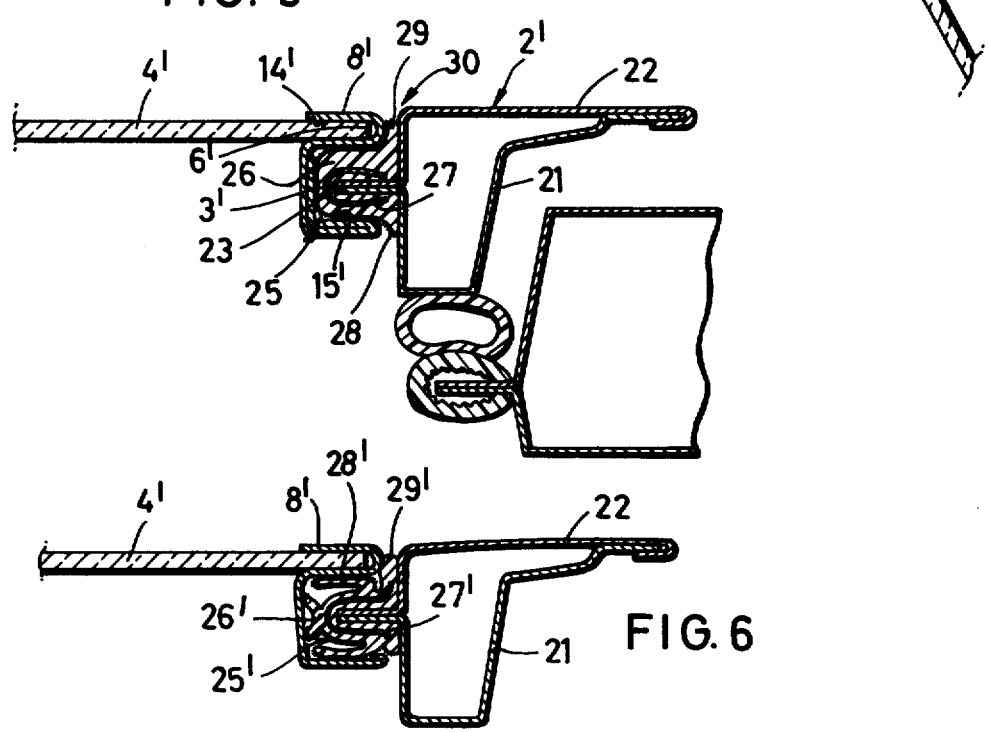
FIG. 5
FIG. 6

WINDOW GUIDE AND SEAL FOR LOWERABLE VEHICLE WINDOW

The invention is based on a window guide and seal for a lowerable window in a motor vehicle according to the description of patent claim 1.

From German laid-open Patent De-As No. 24 35 766 a window guide and seal of this type is already known. The window which is in itself flat is here encompassed at its edges by a rim which forms an inward rebounding edge.

This known embodiment has the disadvantage that the rim running round the edge of the window pane can distrub the line off vision of the occupant of the vehicle when the window is partially lowered. This disadvantage persists even if, as suggested, the inner edge of the window is formed by the material of the window, that is by the glass or the edge strip is affixed only to the inside of the window.

From German Patent De-OS No. 28 47 404 gives an embodiment of this type of design. It can easily be seen from FIG. 2 that even the inward rebounding edge made of the material of the window has a disturbing effect caused by optical distortions when the window is partially lowered.

German Patent De-OS No. 28 26 949 FIG. 3 gives a window fixture for a non lowerable triangular window using an edge rim which has an S shaped profile.

German Patent De-OS No. 38 40 811 gives the associated window guide and seal for the lowerable window. Here guideways and sealing strips are disposed in the frame opening which interacts with guides fixed directly at the level of the window. The upper inclined or horizontal edge of the window can here be sealed by the same sealing strip.

This know specific embodiment has the disadvantage that especially the upper edge of the window is not reliably held in view of the suction forces acting on the window at high travelling speed.

It is the function of the invention based on the extensive state of the art, to create a window guide and seal for a lowerable window in a motor vehicle, the upper edge of which does not cause any disturbing influence on the visibility situation for the occupants of the vehicle and which is reliably held when subjected to the suction forces occurring at high travelling speeds.

According to the invention this problem is solved if a window guide and seal according to the description of patent claim 1 has the features indicated in the specification of patent claim 1. In claims 2 and 3 two alternative specific embodiments of the invention are explained.

Since the window is firmly connected only at its lateral, vertical edges with guideways and at its upper inclined or horizontal edge interacts with a sealing strip fixed in the frame opening, in the case of a flat window, of which the plane of the window is in alignment with the external surface of the bodywork, a reliable guide and seal, an upper edge which in optical terms is perfect and a reliable supporting of the same when the window is closed are obtained.

Since the guideways fixed to the lateral, vertical edges have an S shaped profile and with their narrow section encompass the vertical edges of the window and with their wide sections slide on the flocking or the flocked lips of an edge protection guideway fitted to a flange in the frame opening, a particularly economical construction of the frame opening of the part of the bodywork receiving the window, e.g. a vehicle door, is made possible if this consists only of a one-piece inner plate and a one-piece outer plate which are joined together at their outer edges by flanges and at their frame openings by simple spot welded flange.

Since the guideways fitted at the lateral vertical edges have an S shaped profile and encompass with their narrow section the vertical edges of the window and with their free side of their wide sections slide in a flocked sealing guideway disposed in a U channel, then it is possible to dispose a flat window with a plane aligned with the outer surface of the bodywork even in frame openings which in the conventional manner have a U profile to receive conventional window arrangements.

The invention is explained in greater detail with the aid of two exemplified embodiments illustrated in the drawings.

Shown in:

FIG. 4 Is a section through a further specific embodiment of the sealing strip fitted in the upper frame opening;

FIG. 5 Is a section through a preferred specific embodiment of the guideway fitted to the lateral vertical edges and FIG. 6 Is a section similar to FIG. 5 through a further specific embodiment.

Figure 1:
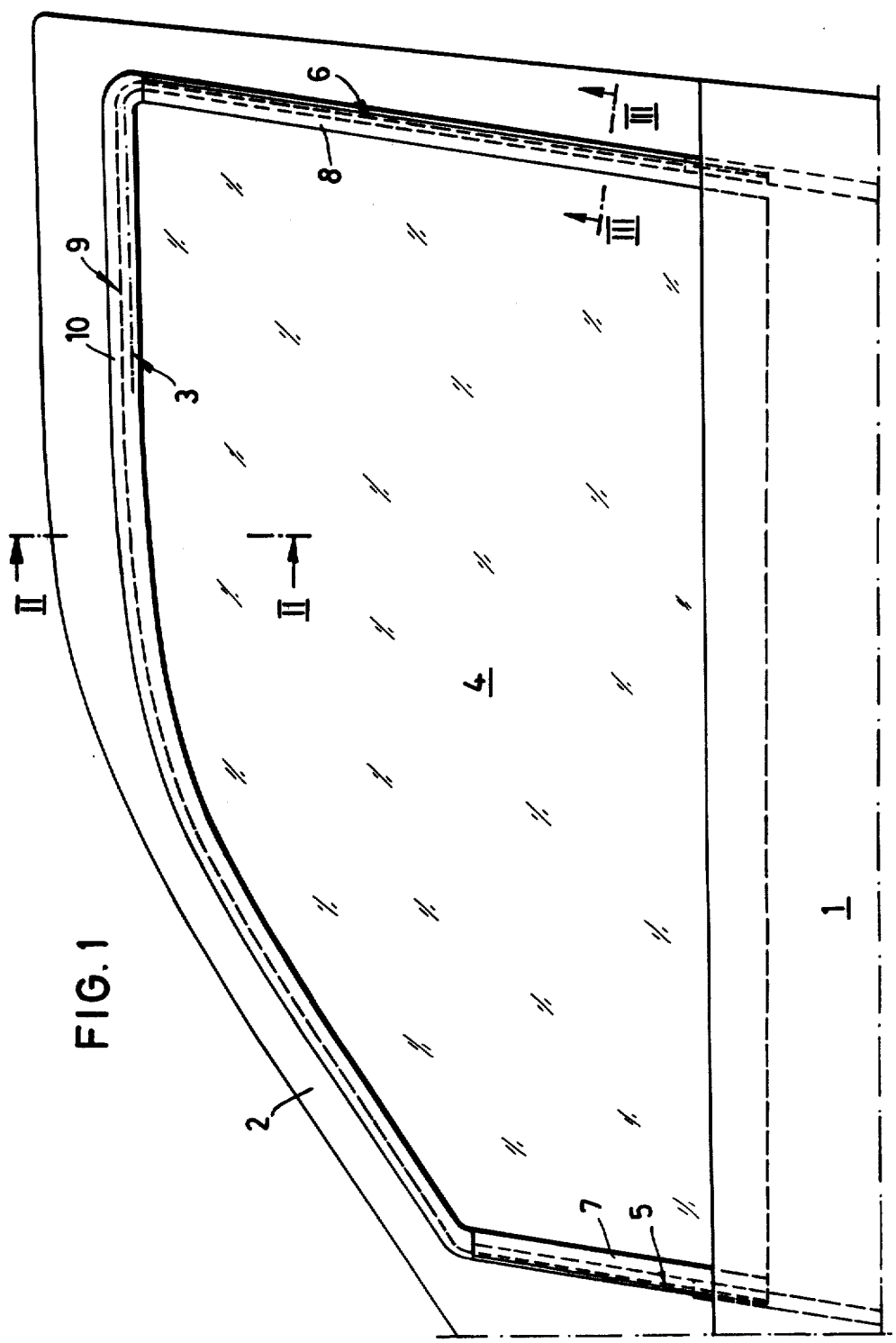
FIG. 1 Is a side view of the upper part of a front vehicle door with a lowerable window according to the invention.

In FIG. 1 a front vehicle door 1 has a frame part 2. In frame opening 3 is disposed a lowerable window 4. The window 4 is here firmly connected only at its lateral vertical edges 5 and 6 with guideways 7 and 8 respectively. The window 4 is cut in known fashion at is upper, inclined or horizontal edge 9 and interacts with the sealing strip 10 fixed at the top of the frame opening 3.

Figure 2:
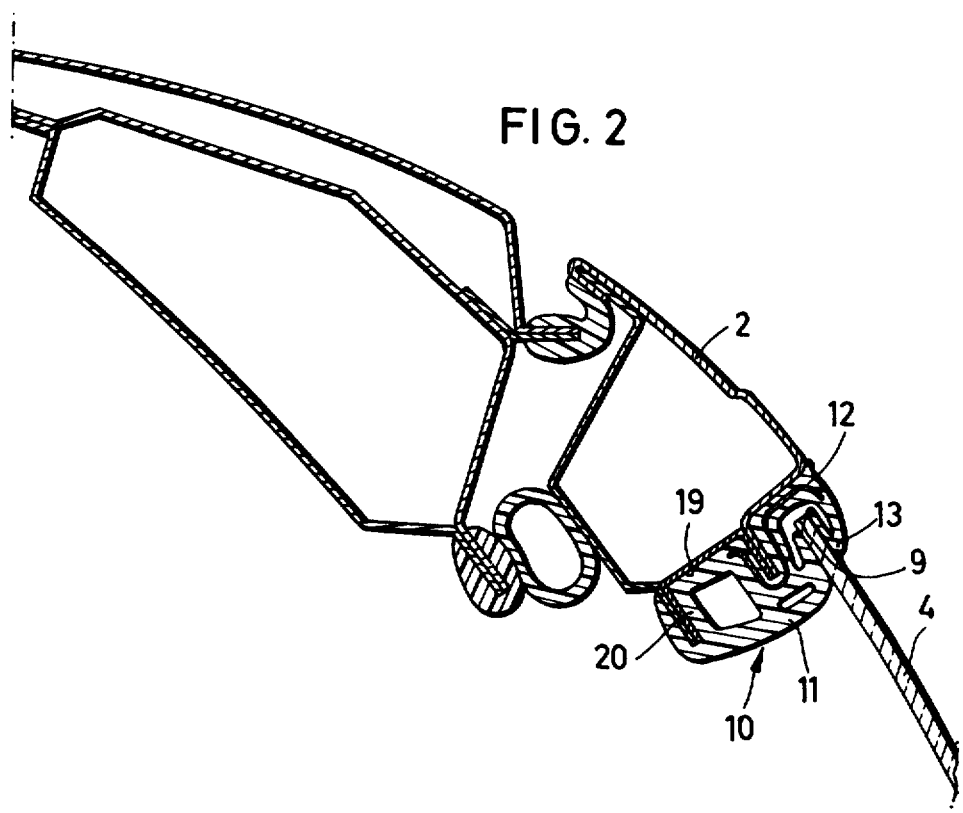
FIG. 2 Is a section along the line II—II in FIG. 1.

As can be seen particularly from FIG. 2 the sealing strip 10 consists of an elastic sealing profile 11 which is reinforced by a metallic supporting profile 12. The metallic supporting profile 12 here has an S shaped cross-section in order especially to support the outer sealing lip 13 of the elastic sealing profile 11, in order thus to keep the window 4 secure when subjected to the suction forces occurring at high travelling speeds.

Figure 3:
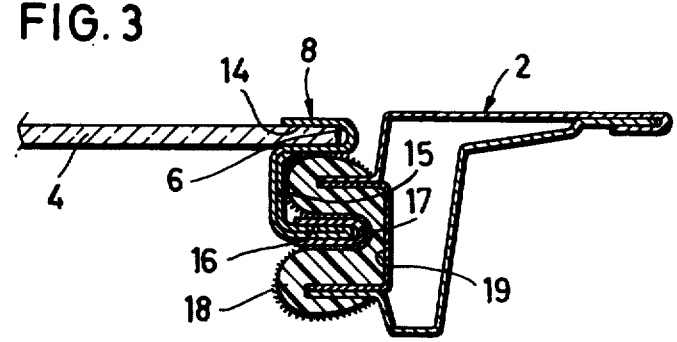
FIG. 3 Is a section along the line III—III in FIG. 1.

As can be seen particularly from FIG. 3 the lateral vertical edge of the window 4 is firmly connected with a guideway 8. The guideway 8 has an S shaped profile and is preferably made of metal. The guideway 8 has at its S shaped profile a narrower section 4 and a wider section 15. The narrower section 14 is here preferably clamped at the vertical edge 6 of the window 4 and a secure clamping can be obtained if at the edge 6 of the window 4 in the area covered by the narrow section 14 of the guideway 8 structures or lines of a ceramic material are sinter-fused onto the surface of the glass. The wider section 15 of the guideway 8 engages with its free side 16 which can be provided with a rim 17 into a flocked seal and guideway 18, the construction of which corresponds to known window guideways and which is disposed in known fashion in a U shaped channel 19 in the frame opening 3.

In this connection it is pointed out that normally the U shaped channel 19 in the frame opening 3 is disposed in rotation, so that the sealing strip 11 fixed in the upper part of the frame opening 3 has a packing 20 which fills this channel 19.

In FIGS. 4 and 5 is shown a further specific embodiment of the window guide and seal according to the invention, which makes possible a particularly economical simple construction of the frame part 2' which encompasses the window 4'.

The frame part 2' can here be formed from an inner plate 21 and an outer plate 22 which are joined together along a spot welded flange 23 in the frame opening 3'.

From FIG. 4 can be seen the construction of the sealing strip 10' fixed in the upper part of the frame opening 3' for the upper inclined or horizontal edge 9' of the window 4'.

The sealing strip 10' again consists of an elastic sealing profile 11' and a metallic supporting profile 12' and an outer sealing lip 13'. Since here the outer sealing lip 13' is directly invisible from without it can, as shown in FIG. 4, be overlapped by a shield 24 which also overlaps the upper frame part 2'.

FIG. 5 shows the construction of the guideway 8' fixed at the rear edge 6 of the window 4'. The guideway 8' again has an S shaped profile with a narrow section 14' and a wider section 15'. The narrower section 14' is again, with reference to and as illustrated in FIGS. 1, to 3, clamped to the edge 6' of the window 4'. The wider section 15' here encompasses a flocked edge protection guideway 25 which is fixed on the welded flange 23 of the frame opening 3'.

The flocked edge protection guideway 25 or 25' can consist in known fashion of an elastic sealing profile 26 or 26' and a metallic supporting profile 27 or 27'. The essential element of this edge protection guideway 25 is here the external flocking 28 or the flocked lips 28' which interact with the wider section 15' of the guideway 8' as a sliding guide. The edge protection guideway 25 or 25' also has a protecting packing 29 or 29' in order to fill the gap 30 behind the edge of the guideway 8' and the adjacent frame part 2'.

Of course the vehicle door or its frame is sealed at the bodywork opening by means of corresponding edge protection sealing strips which, however, because they do not form part of the invention, were not explained in greater detail.

We claim:

1. Window guide and seal for a lowerable window in a motor vehicle door, of which the plane of the window is in aligment with the external surface of the bodywork and which is connected at its edges with edge strips forming inward-rebounding rims which interact with guideways and sealing strips disposed in the frame opening, characterized in that the window is firmly connected only at its lateral and vertical edges with guideways and at its upper inclined and horizontal edge interacts with a sealing strip fixed in the frame opening, the sealing strip being fixed in the upper section of the frame and comprising an elastic sealing portion and a metallic supporting portion carried internally of the elastic sealing portion and being of S-shaped cross-section partially surrounding a portion of the frame, the elastic sealing portion having an external sealing lip which supports the window from the outside, the metallic supporting portion extending within the external sealing lip to increase the outboard support for the window.

2. Window guide as claimed in claim 1, characterised in that the guideways (7' and 8') fixed at the lateral vertical edges (5' and 6') have an S shaped profile and with their narrower section (14') encompass the vertical edges (5' and 6') of the window (4') and with their wider section (15') slide on the flocking (28) and the flocked lips (28') of an edge-protection guideway (25 and 25') fitted to a flange (23) in the frame-opening (3').

3. Window guide as claimed in claim 1, characterized in that the guideways (7 and 8) fixed on the lateral vertical edges (5 and 6) have an S shaped profile and with their narrower section (14) encompass the vertical edges (5 and 6) of the window (4) and with their free sides (16) of the wide sections (15) slide in sealing and guiding tracks (18) disposed in U shaped channels (19).

4. Window guide as claimed in claim 1, characterised in that the guideways (7 and 8 or 7' and 8') are fixed by clamping with their narrower sections (14 or 14') to the vertical edges (5 and 6 or 5' and 6') of the window (4 or 4') whereby the edges of the window (4 or 4') are provided in these areas with lines or structures made of sintered ceramic material.

5. Window guide as claimed in claim 2 characterised in that the edge protection guideways (25 or 25') consist of an elastic guiding profile (26 or 26') and a metallic supporting profile (27 or 27'), have an external flocking (28), which is in itself known, as flocked lips (28') and are provided with a packing strip (29 or 29').

6. Window guide as claimed in claims 1, 2 or 3 characterised in that the external sealing lip (13') is reinforced and covered by a shield (24) which overlaps the outer panel of the door (22).

* * * * *